US005197189A

United States Patent [19]

Schreiber et al.

[11] Patent Number: 5,197,189

[45] Date of Patent: Mar. 30, 1993

[54] METHOD OF MAKING A CYLINDER HEAD WITH A PORT LINER

[75] Inventors: Klaus-Hagen Schreiber, Meine; Fred Thiele, Braunschweig, both of Fed. Rep. of Germany

[73] Assignee: Volkswagen AG, Wolfsburg, Fed. Rep. of Germany

[21] Appl. No.: 751,125

[22] Filed: Aug. 28, 1991

[30] Foreign Application Priority Data

Sep. 6, 1990 [DE] Fed. Rep. of Germany ....... 4028219

[51] Int. Cl.[5] .............................................. B23P 15/00

[52] U.S. Cl. ............................ 29/888.061; 29/888.06; 29/DIG. 5

[58] Field of Search ...................... 29/888.06, 888.061, 29/888.41, 888.453, DIG. 5; 164/98

[56] References Cited

U.S. PATENT DOCUMENTS 2.225.807 12/1940 Fowler .......................... 29/888.061
4.570.585 2/1986 Hayashi .......................... 29/888.061
4,604,779 8/1986 Narita et al. .................. 29/888.061
4,676,064 6/1987 Narita et al. .................. 29/888.061

FOREIGN PATENT DOCUMENTS 2323793 11/1974 Fed. Rep. of Germany .
2537676 4/1976 Fed. Rep. of Germany .
2602434 7/1977 Fed. Rep. of Germany .
2948910 6/1981 Fed. Rep. of Germany .
0339453 11/1989 Fed. Rep. of Germany .
151714 11/1979 Japan ............................... 29/888.06
713109 8/1954 United Kingdom ............ 29/888.06

*Primary Examiner*—P. W. Echols
*Assistant Examiner*—David P. Bryant
*Attorney, Agent, or Firm*—Brumbaugh, Graves, Donohue & Raymond

[57] ABSTRACT

To simplify the manufacture of a cylinder head having at least one port liner surrounding a compression change passage, the port liner, a valve seat ring and a lift valve guide are welded together to make a unitary gas-passage-forming member and the cylinder head is cast around the gas-passage-forming member.

4 Claims, 1 Drawing Sheet

METHOD OF MAKING A CYLINDER HEAD WITH A PORT LINER

BACKGROUND OF THE INVENTION

This invention relates to methods for making cylinder heads for internal combustion engines with intake or exhaust port liners.

Port liners are used in internal combustion engines to provide heat insulation between the hot exhaust gases and the cylinder head. For the same reason, such liners are usually included in the exhaust and intake passages as well. European Patent Application No. 0 339 453 discloses a tubular insert, for example, a pressed hollow sheet metal fitting in the cylinder head, for the purpose of achieving especially favorable flow conditions in a compression change gas passage. In that disclosure, the gas passage is fabricated using removable cores, which do not permit free forming of the passage.

According to the European application, the port liner is inserted into a passage which is produced by the removable cores after the cylinder head has been formed by injection or pressure casting. On the other hand, the port liners disclosed in German Offenlegungsschrift No. 26 02 434 and German Patent No. 29 48 910 provide a core or lost mold to shape the compression change passage during casting of the cylinder head. However, a disadvantage of both of these known methods is that the valve seat ring and the valve guide associated with the passage must either be positioned in the mold as separate parts during casting or subsequently mounted in the cylinder head after casting.

Understandably, however, the latter two constructions, in which the port liner is cast in, are advantageous in comparison to the manufacture of the cylinder head compared to the arrangement disclosed in German Offenlegungsschrift No. 23 23 793. According to that disclosure, the port liner is inserted after the casting operation and is connected to the valve seat ring by welding or by a pin connection, for example. Moreover, that arrangement requires an opening in the port liner in the vicinity of the valve guide, which must pass through a recess in the port liner in gas-tight relation to the liner.

Finally, German Offenlegungsschrift No. 25 37 676 discloses a heat-insulating liner for the exhaust passage of an internal combustion engine in which the liner also forms the valve seat ring and is cast into the cylinder head. The exhaust passage has a lift valve with a valve seat ring traversing a recess in the port liner and projecting comparatively far into the flow passage.

SUMMARY OF THE INVENTION

Accordingly, it is an object of the invention to provide a method of making a cylinder head with a port liner which overcomes the disadvantages of the prior art.

Another object of the invention is to provide a method of making such a cylinder head that is simplified with respect to that disclosed in German Offenlegungsschrift No. 25 37 676.

These and other objects of the invention are attained by providing an integral port liner and valve guide member which serves as a core during formation of a cylinder head.

Thus, in the method according to the invention, a hollow cylindrical valve guide integrated with the port liner having a valve seat ring is used as the casting core. This, however, does not impose any restriction on the optimum choice of material for the port liner, the valve seat ring or the valve guide since these three components may be made as separate parts and then joined, for example, by welding such as friction welding or electron beam welding.

The invention offers advantages not only with respect to simplifying the method of manufacture but also with respect to the possibility of free forming of compression change flow cross-sections since the valve guide need not pass through an opening in the port liner itself, but instead can extend entirely outside of the flow cross-section of the port liner. Consequently, the valve guide does not affect the exhaust gas or fresh gas flow in the compression change passage.

Another advantage of the invention is that it can be readily adapted for formation of the cylinder head by pressure casting.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
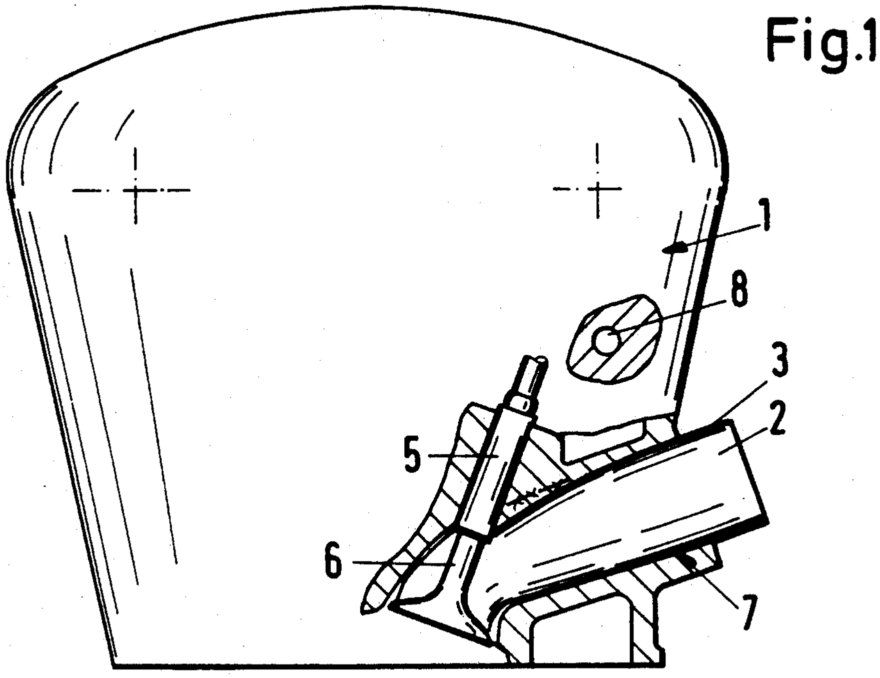
FIG. 1 is a schematic end view of a cylinder head, partially in section, showing a representative gas flow passage formed in accordance with the invention.

The typical cylinder head 1 made in accordance with one embodiment of the invention, which is shown in the drawings, may be produced by casting in a conventional manner. In order to obtain an inlet passage 2 in accordance with the invention without the need for additional shaping cores which must be extracted or destroyed after casting, a port liner 3 is placed in a casting mold which is of conventional construction and not illustrated. The port liner 3 is part of a unitary gas-passage-forming member 7 consisting of a valve seat ring 4 and a valve guide 5 for a lift valve 6, shown in FIG. 2. This unitary member 7 thus constitutes, in effect, a lost mold for the portion of the cylinder head 1 providing the gas inlet passage since it becomes fixed in the cylinder head. When the cylinder head is formed by pressure casting, the unitary gas-passage-forming member 7 is filled with a pressure-resistant filler material which is removed after the head has been cast.

The cylinder head also includes an oil supply pipe 8. This pipe provides a conduit for lubricating and/or coolant oil but, during the casting operation, it likewise constitutes a type of lost mold to produce the conduit since it becomes fixed in the cylinder head.

Figure 2:
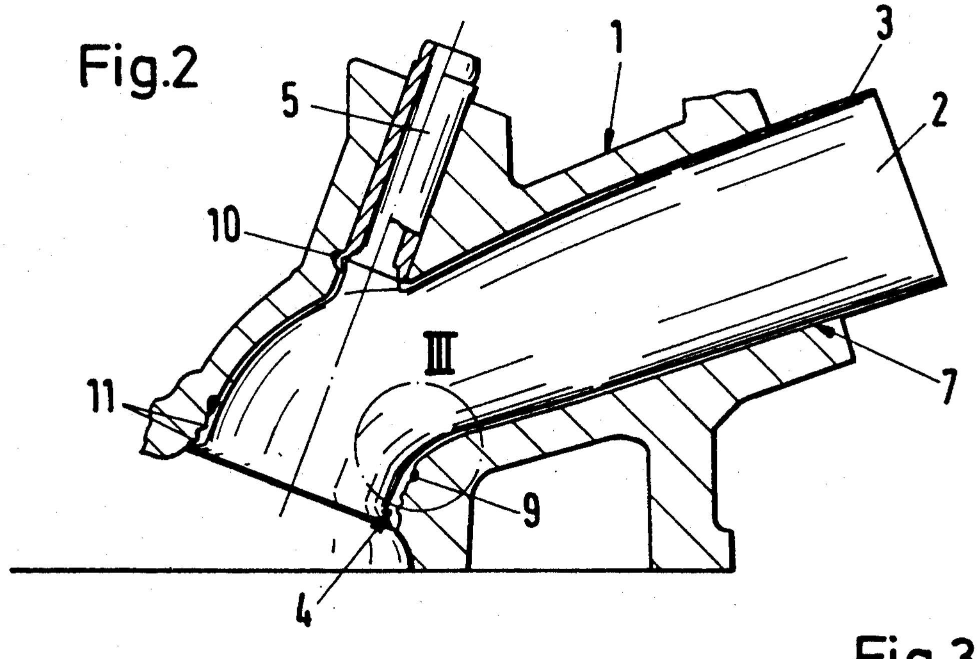
FIG. 2 is an enlarged fragmentary view illustrating the gas flow passage shown in FIG. 1 in greater detail.

In FIG. 2, the unitary gas-passage-forming member 7 is shown in greater detail. As shown in that figure, the three parts 3, 4 and 5 of the unitary member 7 are joined by welded connections 9 and 10. Thus, it is possible to select the optimum materials for each of these three parts which may have different wall thicknesses and cross-sectional shapes, if required. In the illustrated embodiment, the wall thickness of the valve guide 5 is greater than that of the port liner 3, as is the wall thickness of the valve seat ring 4. Moreover, the valve seat ring 4 is provided with grooves 11 in its outer surface to form a secure attachment to the body of the cylinder head 1 and to improve heat transfer.

Figure 3:
FIG. 3 is an enlarged fragmentary view of a portion of the gas passage shown in FIG. 2.

As FIG. 3 illustrates in larger scale, the port liner part 3 may be provided, before it is cast in the head, with a coating 12 of a heat-insulating material or a material selected to compensate for the differential coefficients of thermal expansion of the several materials of the cylinder head and port liner. The coating 12 may be applied, for example, by spraying or dipping.

The invention thus provides a method of making a cylinder head which, with minimal production cost and largely avoiding additional molding cores, enables the formation of rheologically optimized compression change passages in the cylinder head.

Although the invention has been described herein with reference to specific embodiments, many modifications and variations therein will readily occur to those skilled in the art. Accordingly, all such variations and modifications are included within the intended scope of the invention.

We claim:

1. A method for making a cylinder head for an internal combustion engine including a valve guide, a valve seat ring and a compression change passage with a port liner which includes at least one tube extending over the entire length of the compression change passage, said method comprising providing as separate parts a port liner tube, a valve guide, and a valve seat ring formed with grooves on its external surface, joining the valve seat ring and the valve guide to the port liner tube to form a unitary gas-passage-casting member, and forming the cylinder head about the unitary gas-passage-forming member.

2. A method according to claim 1 wherein the gas-passage-forming member is formed with the valve guide projecting outwardly from the port liner tube.

3. A method according to claim 1, including the step of providing a pipe in the cylinder, head, said pipe serving as a fluid passage for lubricant and/or coolant.

4. A method according to claim 1, including applying an external layer to the port liner tube before the cylinder head is formed to provide heat insulation or compensation for differences in thermal expansion of the port liner tube and the cylinder head.

* * * * *

UNITED STATES PATENT AND TRADEMARK OFFICE

CERTIFICATE OF CORRECTION

PATENT NO. : 5,197,189

DATED : March 30, 1993

INVENTOR(S) : Schreiber et al.

It is certified that error appears in the above-identified patent and that said Letters Patent is hereby corrected as shown below:

Column 4, bridging lines 10 and 11, "forming" should read --casting--.

Signed and Sealed this

Eleventh Day of January, 1994

Attest:

Bruce Lehman

BRUCE LEHMAN

Attesting Officer

*Commissioner of Patents and Trademarks*